United States Patent
Forschmiedt et al.

(10) Patent No.: US 9,317,452 B1
(45) Date of Patent: Apr. 19, 2016

(54) SELECTIVE RESTRICTIONS TO MEMORY MAPPED REGISTERS USING AN EMULATOR

(71) Applicant: Amazon Technologies, Inc., Reno, NV (US)

(72) Inventors: Kent David Forschmiedt, Shoreline, WA (US); Nicholas Patrick Wilt, Mercer Island, WA (US); Matthew David Klein, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 212 days.

(21) Appl. No.: 14/083,118

(22) Filed: Nov. 18, 2013

(51) Int. Cl.
*G06F 12/00* (2006.01)
*G06F 12/14* (2006.01)
G06F 12/10 (2006.01)
G06F 9/455 (2006.01)

(52) U.S. Cl.
CPC ........ G06F 12/1458 (2013.01); *G06F 9/45558* (2013.01); *G06F 12/1009* (2013.01); *G06F 12/145* (2013.01); *G06F 12/1483* (2013.01); *G06F 12/1491* (2013.01)

(58) Field of Classification Search
USPC ............. 711/163, 152, 164, 6; 703/23; 710/5; 718/1
See application file for complete search history.

(56) References Cited

U.S. PATENT DOCUMENTS

| 8,627,140 | B2* | 1/2014 | Hattori | G06F 11/079 714/6.13 |
|---|---|---|---|---|
| 2007/0011419 | A1* | 1/2007 | Conti | 711/163 |
| 2007/0050580 | A1* | 3/2007 | Lewis | 711/163 |
| 2008/0222397 | A1* | 9/2008 | Wilkerson et al. | 712/220 |
| 2008/0244155 | A1* | 10/2008 | Lee et al. | 711/6 |
| 2011/0246171 | A1* | 10/2011 | Cleeton | G06F 9/45558 703/25 |
| 2013/0138907 | A1* | 5/2013 | Farrell et al. | 711/164 |
| 2015/0052325 | A1* | 2/2015 | Persson et al. | 711/163 |

OTHER PUBLICATIONS

"Page table," http://en.wikipedia.org/wiki/Page_table, last modified on Oct. 18, 2013, 6 pages.
"Second Level Address Translation," http://en.wikipedia.org/wiki/Second_Level_Address_Translation, last modified on Nov. 13, 2013, 3 pages.

* cited by examiner

*Primary Examiner* — Hong Kim
(74) *Attorney, Agent, or Firm* — Klarquist Sparkman, LLP

(57) ABSTRACT

A virtual machine environment in which a hypervisor provides direct memory mapped access by a virtual guest to a physical memory device. The hypervisor prevents reading from, writing to, or both, any individual register or registers while allowing unrestricted access to other registers, and without raising any abnormal condition in the guest's execution environment. For example, in one embodiment, the hypervisor can apply memory access protection to a memory page containing a restricted register so that a fault condition can be raised. When an instruction is executed, the hypervisor can intercept the fault condition and emulate the faulting guest instruction. When the emulation accesses the restricted address, the hypervisor can selectively decide whether or not to perform the access.

22 Claims, 10 Drawing Sheets

SELECTIVE RESTRICTIONS TO MEMORY MAPPED REGISTERS USING AN EMULATOR

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

In a virtual environment, a host server computer can run one or more virtual machines using a hypervisor. The hypervisor presents a guest operating system with a virtual operating platform upon which one or more applications can run. In a virtual environment, a host server computer can run one or more virtual machines ("VMs") using a hypervisor. The hypervisor enforces memory protections between VMs so a VM cannot read or write memory belonging to other VMs, which could lead to data breaches or memory corruption. Additionally, VMs generally are prohibited from operating actual hardware in the host server (such as disk and network controllers); instead, the hypervisor provides each VM with emulated hardware. The hardware emulation provides enhanced flexibility and security at a performance cost, since the hypervisor must intervene when a VM tries to operate emulated "hardware." From a security standpoint, none of the software running in a VM is "trusted"—it is a design goal for the virtualized system to be secure and robust even in the face of an active antagonist running in a VM. Such software could launch a denial-of-service attack on the VM (for example, consuming all of the virtual disk or CPU resources allocated to it by the hypervisor), but should not be able to "escape" from the VM and have side effects on the host server or other VMs.

For performance reasons, some hypervisors (Xen, VMWare ESX) provide for VMs to gain full access to the hardware resources of select devices. This feature may be referred to as "direct assignment" or "pass-through." In this case, the hypervisor provides the VM with full access to the memory-mapped I/O (MMIO) registers and other hardware resources of the device in question, enabling a driver in the VM to operate the hardware without the emulation overhead. To keep the system secure even when device pass through is being performed, the hardware and hypervisor can implement various additional security measures. For example, to prevent DMA (direct memory access)-capable hardware from reading or write memory that does not belong to its VM, a so-called IOMMU (I/O memory management unit), exemplified by Intel's Vt-D technology, imposes an additional layer of address translation into the system. When an IOMMU is in use, the "physical addresses" provided to the VM are, in fact, virtual addresses that are translated by the IOMMU. By ensuring that the IOMMU maps only pages belonging to the correct VM, the hypervisor can enforce memory protections even when DMA-capable hardware is made directly available to VMs.

MMIO registers present an especial set of risks to a virtualized environment when devices are passed through to a VM. Because none of the software running in a VM is "trusted," the system must be robust in the face of rogue reads and writes to MMIO registers. Fortunately, since MMIO registers are accessed as if they were virtual memory, the hypervisor can use the same memory protection mechanisms that serve to isolate VMs from one another and to restrict the types of memory access that may be performed.

In one particular example, writing a certain value to an MMIO register may cause the hardware to hang, causing a denial-of-service attack on the host server. This attack vector may be mitigated by write-protecting the MMIO register in question. Such a mitigation may filter out specific values, or prohibit writes to the register altogether.

In another particular example, GPUs contain executable code in the form of a VBIOS (video basic I/O system) that assists in the operation of the hardware. VBIOS is part of the hardware resources, so without a mitigation, the platform runs the risk of a privilege escalation in which an antagonist running in a virtual machine can update the VBIOS and potentially inject arbitrary executable code into the host server's boot sequence. This attack vector may be mitigated by write-protecting the MMIO register(s) needed to update the VBIOS.

DETAILED DESCRIPTION

In one embodiment of a virtual machine environment, a hypervisor provides direct memory mapped access by a virtual guest to a physical I/O device. The hypervisor prevents reading from, writing to, or both, any individual register or registers while allowing unrestricted access to other registers, and without raising any abnormal condition in the guest's execution environment.

For example, in one embodiment, the hypervisor performs the following: 1) remembers (i.e., stores) the restricted register address; and 2) applies memory access protection to the memory page containing the register so that a fault condition can be raised when the guest accesses the register; 3) during guest execution, the hypervisor can intercept the fault condition; 4) the hypervisor can emulate the faulting guest instruction; 5) when the emulation accesses a restricted address, the hypervisor can selectively decide whether or not to perform the access; and 6) the hypervisor can return execution control to the guest application regardless of the decision in 5), as with a normal page fault.

Figure 1:
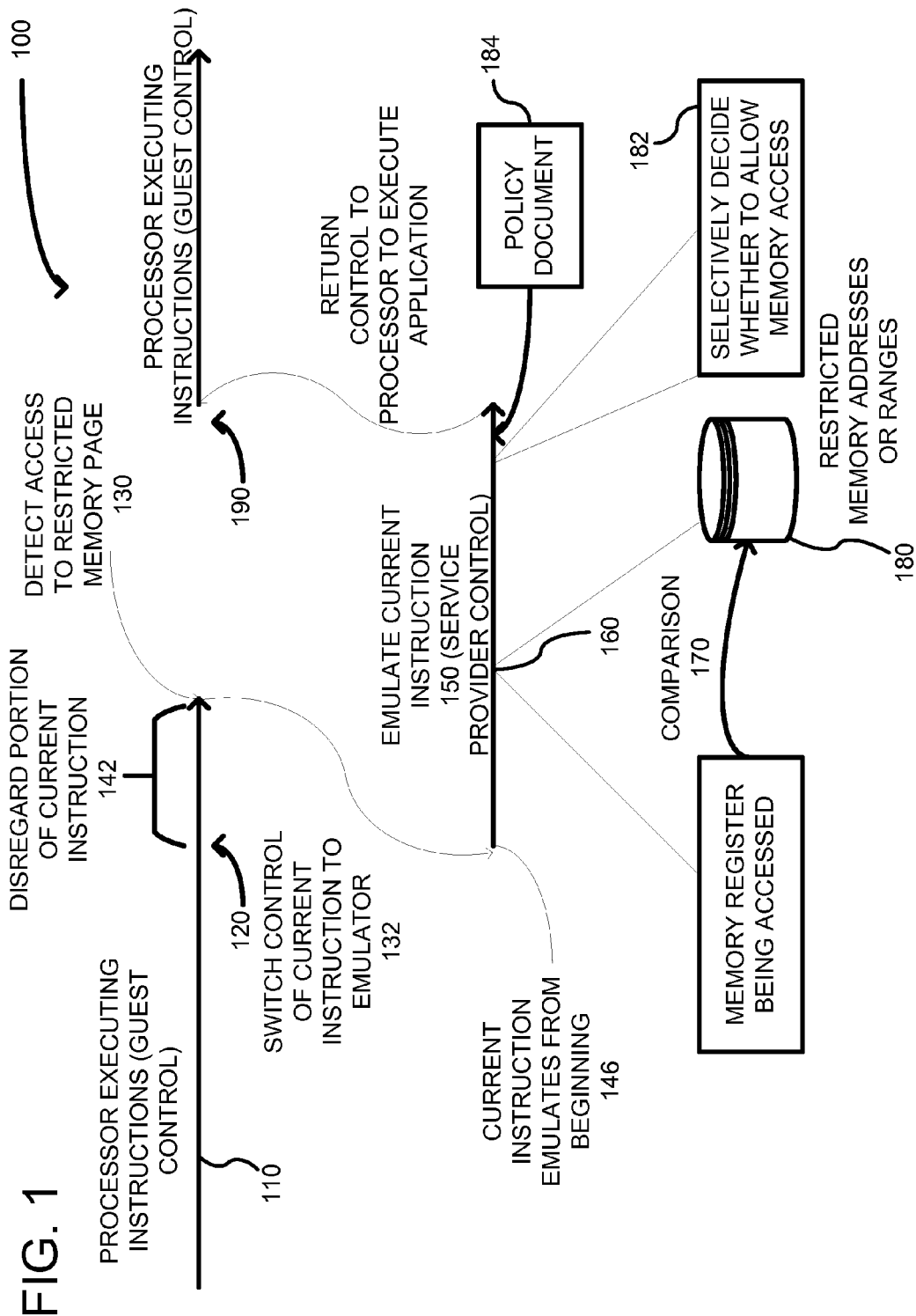
FIG. 1 shows an example timing diagram showing a switching of control between a processor and an emulator during the course of executing an application.

FIG. 1 shows an embodiment of a timing diagram 100 illustrating how a plurality of virtual machine instructions are executed. Time progresses from left to right across the figure. As shown at 110, a processor (e.g., a controller, signal processor, microprocessor, ASIC, or other control and processing logic circuitry) for performing such tasks as signal coding, data processing, input/output processing, power control, and/or other functions executes a series of instructions associated with a guest virtual machine. At point 120, the processor commences execution of a current instruction. At a point 130 during execution of the current instruction, the processor detects an access of a restricted memory page. As further described below, such a detection can occur via a memory management unit (not shown in FIG. 1). The processor can terminate execution of the current instruction, construct a trap frame including information about the current instruction and switch control to an emulator, as shown at 132. The emulator is hardware or software or both that duplicates (or emulates) the functions of one computer system (the guest) in another computer system (the host), different from the first one, so that the emulated behavior closely resembles the behavior of the real system. Once control switches to the emulator, the current instruction is under control of a service provider, rather than the guest virtual machine.

Additionally, as shown at 142, the processor can disregard the current instruction. As shown at 146, the emulator can use the trap frame to reconstruct the execution state of the virtual machine prior to the current instruction and commence execution of the instruction from the beginning. As shown at 150, the current instruction is then emulated in its entirety. During emulation, at a point 160, the emulator can detect access to a memory register (which is actually a control register on an I/O device). The emulator can then make a comparison 170 to a list of memory addresses or memory ranges within a database 180. Using the comparison, the emulator can selectively decide whether or not to allow the current instruction access to the memory register on the restricted memory page, as shown at 182. If the memory register is a restricted register according to the database 180, then the emulator can ignore the memory access and continue with execution of the current instruction. If the memory register it is not restricted, then the emulator can allow access (i.e., read and/or write) to the memory register despite that the memory page is restricted. If access is restricted, the emulator can silently fail on the memory access so that the guest virtual machine is unaware of the fault. Alternatively, the emulator can look to a policy document 184 that can direct the emulator how to respond to the current instruction. Some alternatives include silent failure, fault if failed, falsify data for read access based on previous writes (which are stored), etc. Additionally, the policy document can include a field turning ON or OFF whether the emulator should selectively decide. An ON/OFF field can also control whether there is switching execution from the processor to the emulator. Once the emulator has completed the current instruction, it switches control back to the processor at 190 under the control of the virtual machine. The processor can then continue executing the virtual machine without any knowledge by the virtual machine that the emulator temporarily took control.

Thus, once a memory page fault is detected, control is switched to an emulator under control of a service provider that can analyze a sequence of operations being performed by a processor while executing the current instruction. By analyzing each of the plurality of individual operations that make up the current instruction, the emulator can determine with more accuracy whether to allow access to individual memory registers on a restricted memory page. If accesses are attempted to a restricted memory address, the access can be suppressed.

It should also be noted that although only a single policy document 184 is shown, there can be multiple policy documents that can be used based on a privilege level of the guest virtual machine. For example, a virtual machine of a customer can have a more restrictive policy than a virtual machine associated with an administrator of a service provider. For example, an administrator may be permitted to update control registers of an I/O device, whereas a guest virtual machine may not be permitted.

Figure 2:
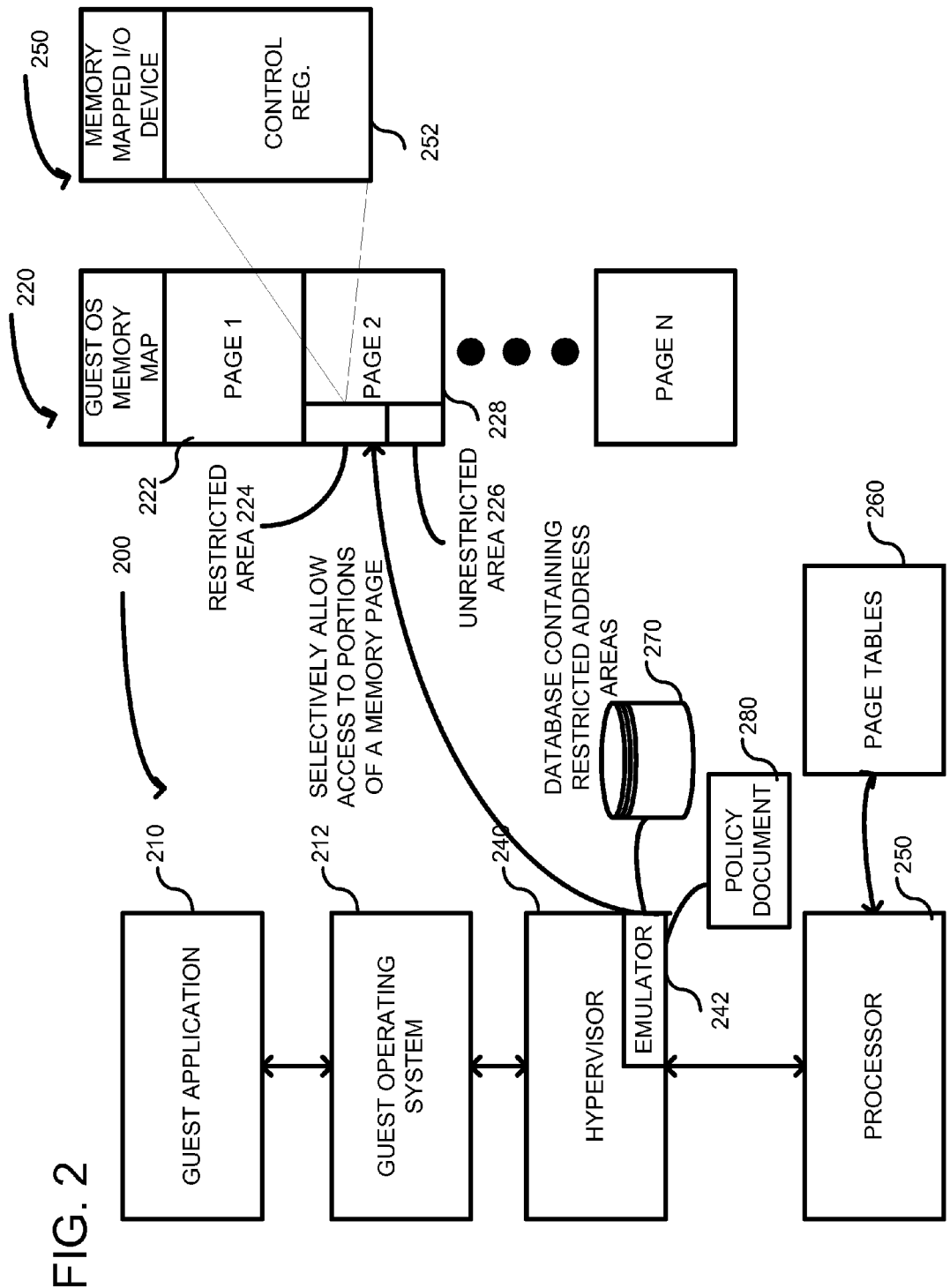
FIG. 2 shows an embodiment of a system wherein an emulator embedded in a hypervisor is used to selectively allow access to portions of a memory page.

FIG. 2 shows an embodiment of a system 200 for selectively allowing access to portions of a memory page. A guest application 210 is executing in conjunction with a guest operating system 212. The guest application 210 and guest operating system 212 can operate together as a virtual machine and can be associated with virtual memory maps for mapping virtual addresses to physical memory. The memory 220 is shown as a guest operating system memory map and can have any number (N) of memory pages, such as memory page 1, shown at 222. Some of the memory pages can include restricted areas 224 (e.g., which map to control registers that change hardware state) and unrestricted areas 226, such as is shown for memory page 2, at 228. The restricted areas 224 can be mapped to an I/O hardware device as shown by memory mapped I/O 250. The I/O device can have a plurality of control registers 252 associated therewith, which can have restricted access from a guest virtual machine. The guest application 210 and guest operating system 212 run on a hypervisor 240. The hypervisor 240 can include an embedded emulator 242, for executing desired instructions of the guest application and/or operating system and for selectively controlling whether or not memory access can be allowed. Although not shown, the emulator can also be a separate component from the hypervisor.

A processor 250 executes the guest 210 instructions (operating system instructions or application instructions), as is well understood in the art. In order to map virtual memory addresses to physical memory addresses, the processor can access page tables 260. As described further below, the page tables 260 can include a field indicating whether the processor should pass control to an emulator controlled by a service provider. Thus, when the processor 250 accesses the page tables 250 to obtain a physical address in order to execute guest instruction, it can detect that the instruction is attempting to access a restricted memory page. In response, the processor 250 can switch control from the guest virtual machine to the emulator 242 for the current instruction. The emulator 242 can execute the current instruction, which can be complex and require a plurality of individual processor operations, such as one or more memory accesses. The emulator can execute and monitor each of the individual operations for any accesses to the restricted memory page. Using memory page 2 at 228 as an example, when a memory page having at least some restricted memory addresses is accessed, the emulator can compare the memory addresses against a predetermined list of addresses or address ranges stored within a database 270. If the memory address is an unrestricted address, such as one within area 226, then the emulator can allow the access, such as allowing a memory write or read. However, if the emulator detects that the memory access is to a restricted area, such as within area 224, then the emulator can check a policy document 280 to determine how to proceed. Each of the memory areas 224, 226 are subsets of the memory page 228. In one embodiment, the emulator 242 can simply not perform the memory access but without any indication to the guest virtual machine that the operation was not performed. In other embodiments, the emulator 242 can perform a fault so that the guest virtual machine is aware of the fault condition. In yet another embodiment, the emulator can set an alarm condition to alert either the guest virtual machine, or other management components in the system. How the policy document controls the emulator's actions is a design choice and any desired action can be used. Moreover, as indicated above, the emulator can selectively decide which policy document to follow based on a privilege level of the guest virtual machine.

Figure 3:
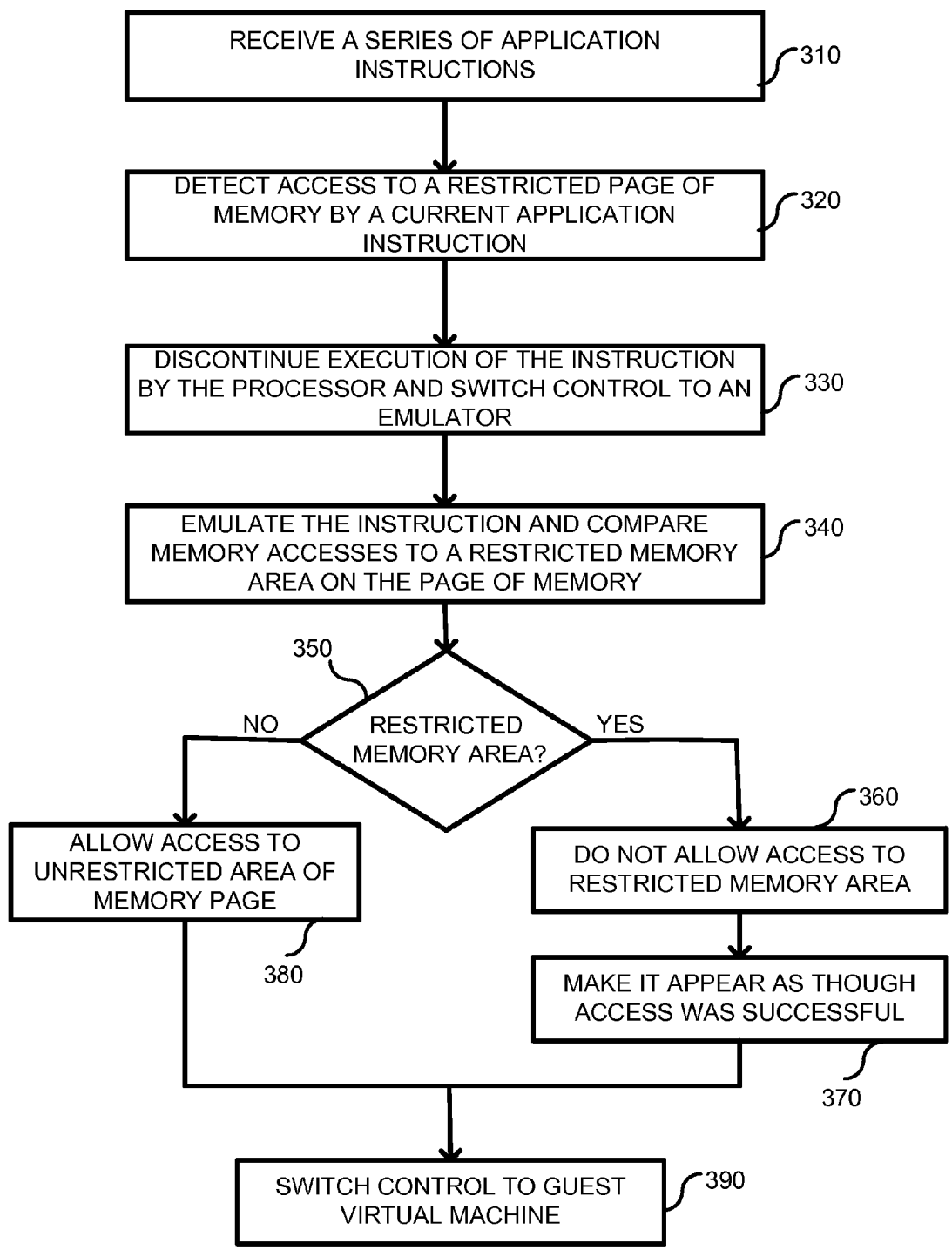
FIG. 3 is a flowchart of an embodiment for selectively deciding whether or not to allow access to a memory page.

FIG. 3 is a flowchart of an embodiment selectively deciding whether or not to allow access to a memory page. In process block 310, a series of instructions in a virtual machine are received. For example, a processor can receive instructions for execution. In process block 320, the processor can detect access to a restricted page of memory by a current instruction. For example, the detection can be the result of accessing a page table that maps virtual addresses to physical addresses and detecting a flag indicating that the memory page that is being accessed is restricted. In process block 330, execution of the instruction can be discontinued and any results can be discarded. Additionally, control of the current instruction can be switched to an emulator under control by a service provider, rather than the virtual machine. For example, information can be stored by the processor related to the current instruction so that the emulator can reconstruct the virtual machine's execution state. Then the processor can call the emulator with the information so as to pass control to the emulator. In process block 340, the current instruction can be emulated. Additionally, any memory accesses can be compared to a restricted area on the memory page, wherein the restricted area is a sub-part of the memory page. In particular, a memory address being accessed by the current instruction can be compared to restricted addresses in the memory page. In decision block 350, a check is made whether the memory address being accessed is a restricted memory address or within a range of restricted memory accesses. If the memory address being accessed is a restricted memory access, then in process block 360, the memory access is not allowed. An example of not allowing the memory access is to ignore a memory read and/or write. By not allowing such a read or write, access to a memory mapped I/O device control register is being restricted. Then in process block 370, the emulator can perform any necessary operations so as to make it appear as though the memory access was successful. For example, the emulator can either suppress any memory faults or otherwise acknowledge the memory access despite that the memory was not, in fact, accessed. If decision block 350 is answered in the negative, then in process block 380, access is allowed to the unrestricted area of the memory page. For example, a memory address can be written and/or read, despite that the overall memory page is marked as restricted. Regardless of the result of decision block 350, in process block 390, control is switched back to the guest virtual machine. Thereafter, the processor can continue to execute the instructions of the virtual machine.

Figure 4:
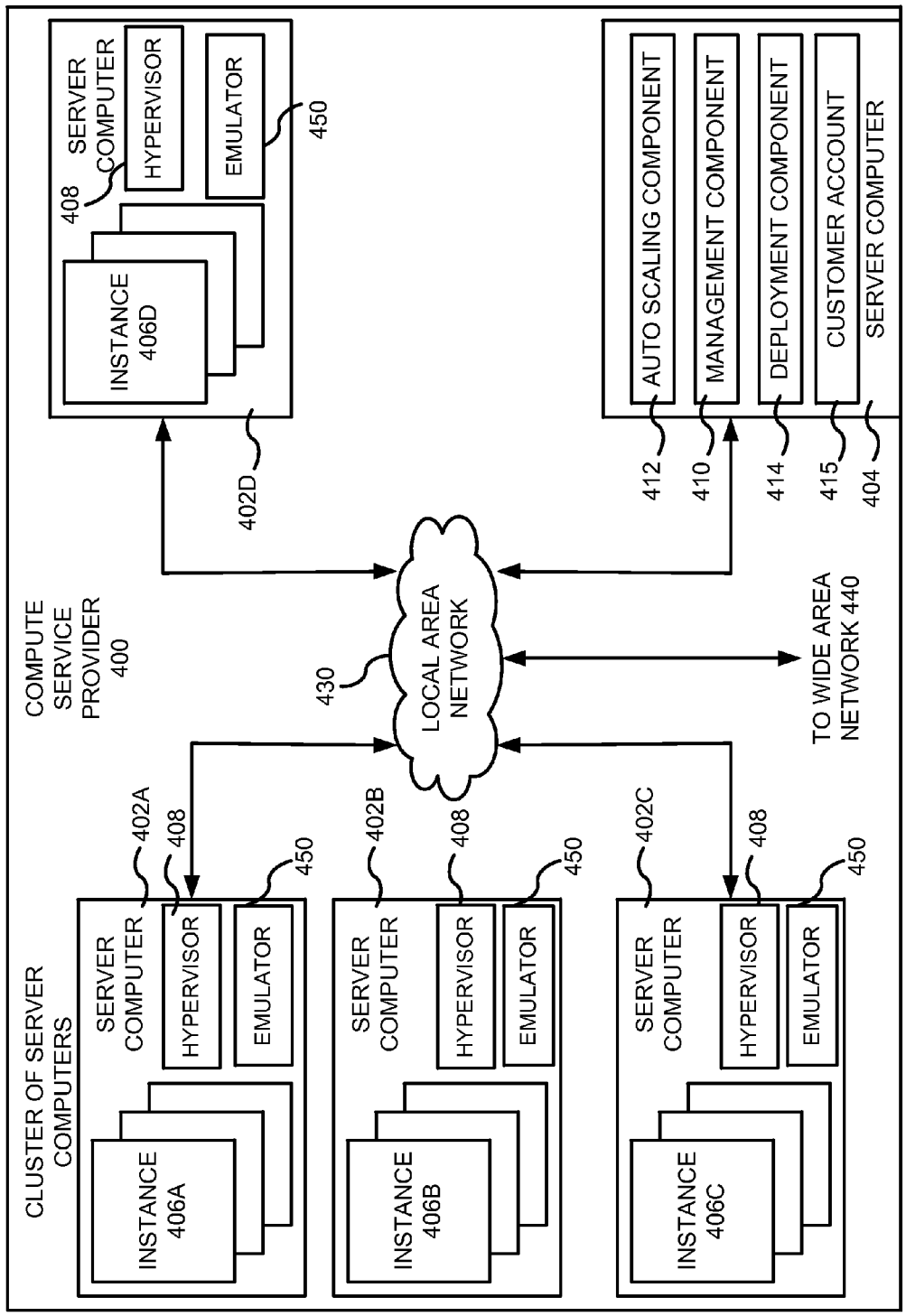
FIG. 4 is an example system diagram showing a plurality of virtual machine instances running in the multi-tenant environment, with an emulator is separated from the hypervisors for emulating application instructions according to one embodiment.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408 or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. An instance manager, described further below, can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. The customer account information can further provide a privilege level which can be used by the emulator to select an appropriate policy document.

A network 430 can be utilized to interconnect the server computers 402A-402D and the server computer 404, 450. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

An emulator 450 is shown separately in FIG. 4 on each server computer 402, but can be embedded in the hypervisors 408 or otherwise executing as a service outside of the server computers. The emulators 450 can be used to emulate instructions in response to a processor call. Any of the instances 406 can attempt memory accesses. When a memory access is to a restricted memory page, the emulator 450 can be called to analyze the memory access in order to determine whether it is to a restricted memory address. In this way, virtual machine's instructions can be dynamically switched back and forth between a processor (under guest control) and emulator (under control of the service provider) in a seamless fashion and transparent to the virtual machine.

Figure 5:
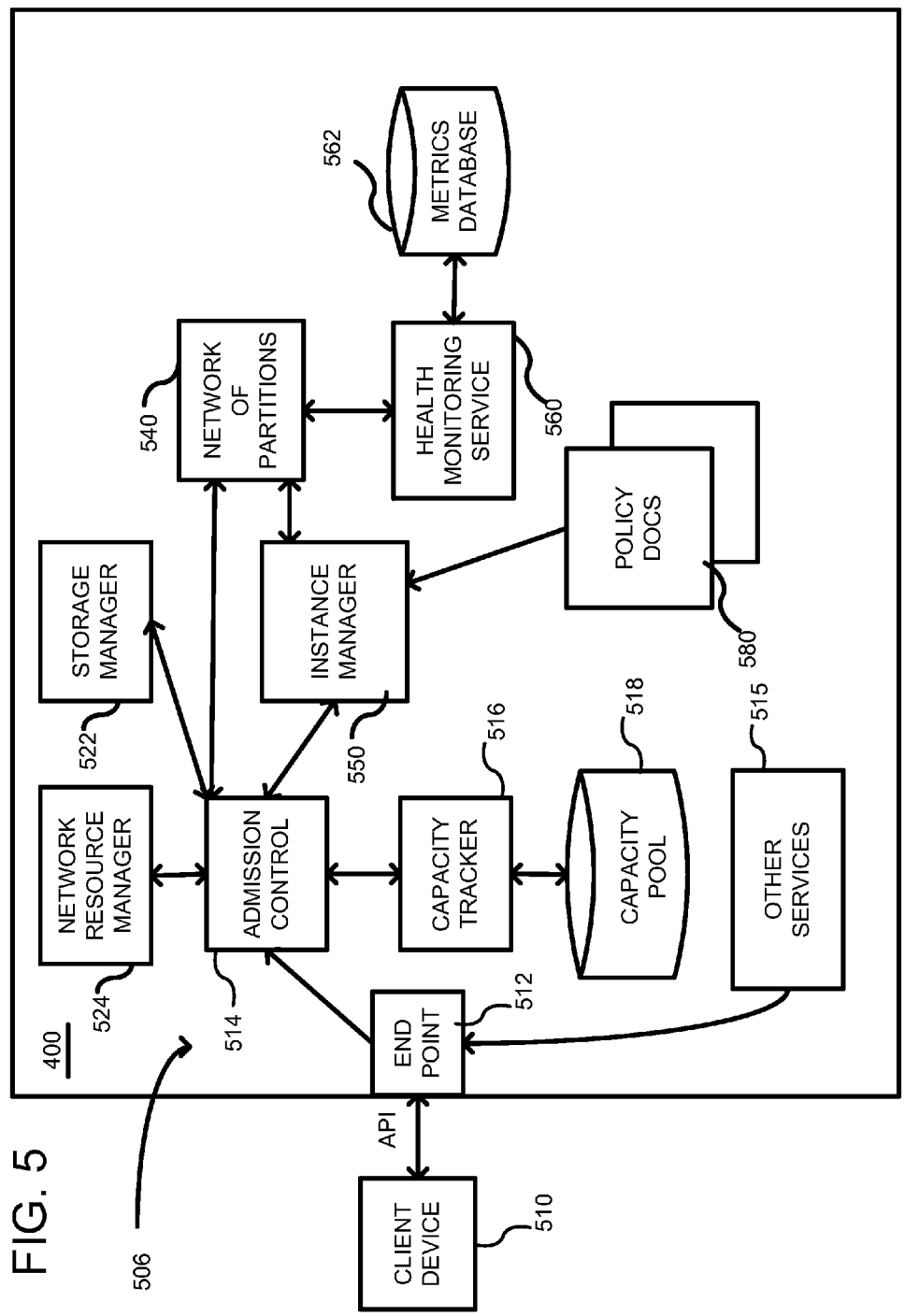
FIG. 5 shows further details of an example system including a plurality of management components associated with a control plane.

FIG. 5 illustrates in further detail management components 506 that can be used in the multi-tenant environment of the compute service provider 400. In order to access and utilize instances (such as instances 406 of FIG. 4), a client device can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Other services 515, which can be internal to the compute service provider 400, can likewise make API requests to the end point 512.

Other general management services that may or may not be included in the compute service provider 400 include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning and real-time configuration and allocation of capacity. The capacity tracker 516 maintains a pool of available inventory in a capacity pool database 518. The capacity tracker 516 can also monitor capacity levels so as to know whether resources are readily available or limited. An instance manager 550 controls launching and termination of instances in the network. When an instruction is received (such as through an API request) to launch an instance, the instance manager pulls resources from the capacity pool 518 and launches the instance on a decided upon host server computer. The instance manager 550 can read one or more policy documents 580 based on a privilege level of the customer. The policy documents 580 can then be used by the emulator to decide access to a memory mapped I/O device. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

A health monitoring service 560 can provide monitoring for resources and the applications customers run on the compute service provider 400. System administrators can use the monitoring service 560 to collect and track metrics, and gain insight to how applications are running. For example, the monitoring service 560 can allow system-wide visibility into application performance and operational health. Metrics generated by the health monitoring service 560 can be stored in the metrics database 562. One such metric is an alarm condition which can be set in response to accessing a restricted memory area.

Figure 6:
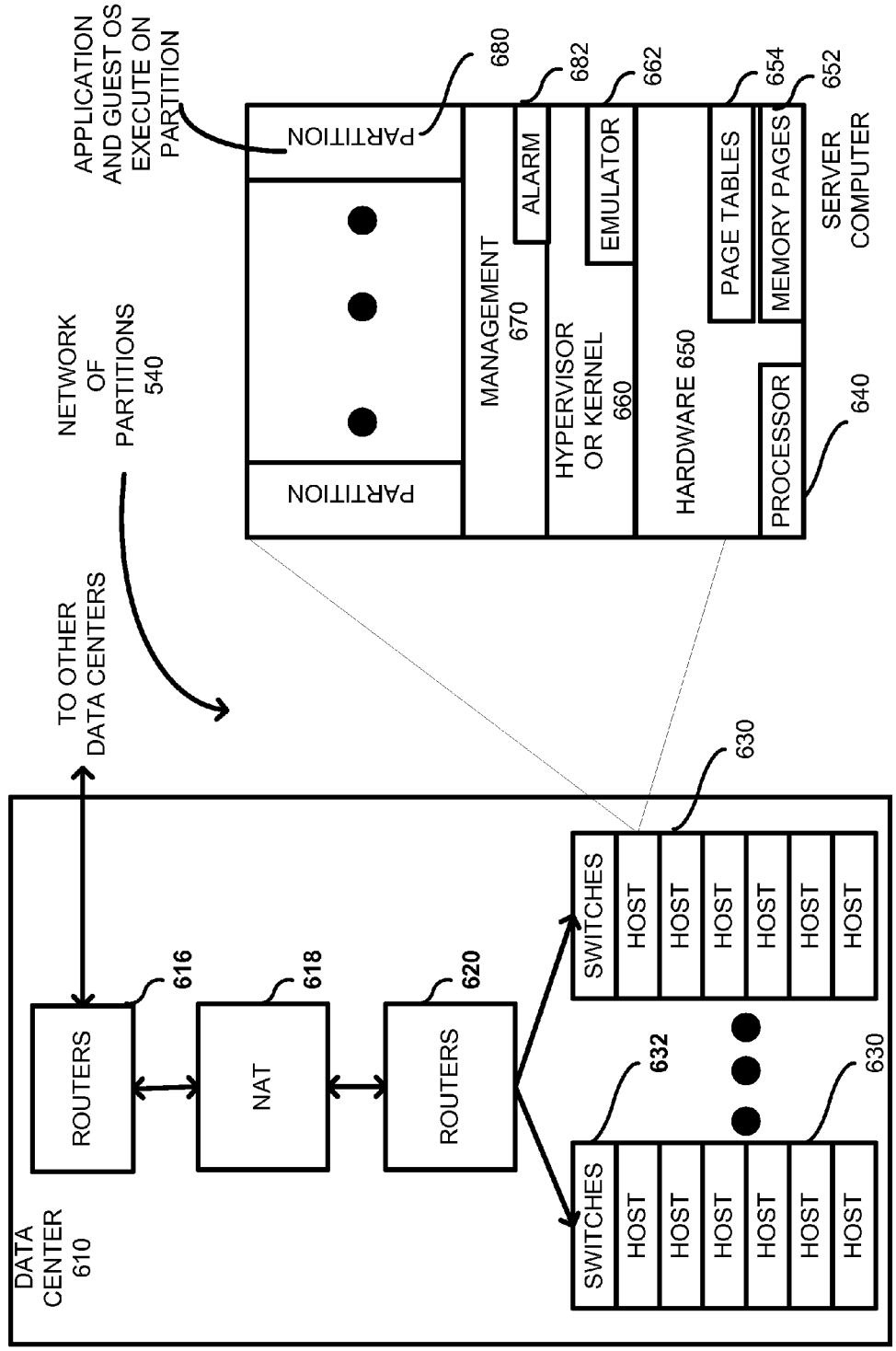
FIG. 6 shows an example of a plurality of host computers, routers and switches, which are hardware assets used for running virtual machine instances.

FIG. 6 illustrates the network of partitions 540 and the physical hardware associated therewith. The network of partitions 540 can include a plurality of data centers, such as data center 610, coupled together by routers 616. The routers 616 read address information in a received packet and determine the packet's destination. If the router decides that a different data center contains a host server computer, then the packet is forwarded to that data center. If the packet is addressed to a host in the data center 610, then it is passed to a network address translator (NAT) 618 that converts the packet's public IP address to a private IP address. The NAT also translates private addresses to public addresses that are bound outside of the datacenter 610. Additional routers 620 can be coupled to the NAT to route packets to one or more racks of host server computers 630. Each rack 630 can include a switch 632 coupled to multiple host server computers. A particular host server computer is shown in an expanded view at 640.

Each host 640 has underlying hardware 650 including one or more processors 640 (e.g., CPU), memory divided into memory pages 652, page tables 654, storage devices, etc. Running a layer above the hardware 650 is a hypervisor or kernel layer 660. The hypervisor or kernel layer can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. The hypervisor or kernel layer can include an emulator 662 embedded therein for performing the emulation operations herein described. A management layer 670 can be part of the hypervisor or separated therefrom and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. An application and/or guest operating system, executing on the partition 680, can execute instructions and can make memory access requests to the processor 640. The processor 640, in turn, can use the page tables 654 in order to transform the virtual memory addresses into physical memory addresses within the memory pages 652. If a memory page is restricted, such as when the memory access is to a control register of a memory mapped I/O device, then the emulator 662 can take control from the processor 640 so as to emulate the current instruction and each operation performed therein. The emulator 662 can then either allow or deny access to the memory pages 652. In some embodiments, the emulator 662 can silently set an alarm 682 for attempted accesses by the guest virtual machine to restricted memory areas, wherein the alarm 682 is stored in the management layer 670 for reporting.

Any applications and operating systems executing on the instances can be monitored using the management layer 670, which can then pass the metrics to the health monitoring service 560 for storage in the metrics database 562. Example metrics can include the alarm 682 that the guest virtual machine attempted access to a restricted area. Additionally, the management layer 670 can pass to the monitoring service 550 the number of instances that are running, when they were launched, the operating system being used, the applications being run, etc. All such metrics can be used for consumption by the health monitoring service 560 and stored in database 562.

Figure 7:
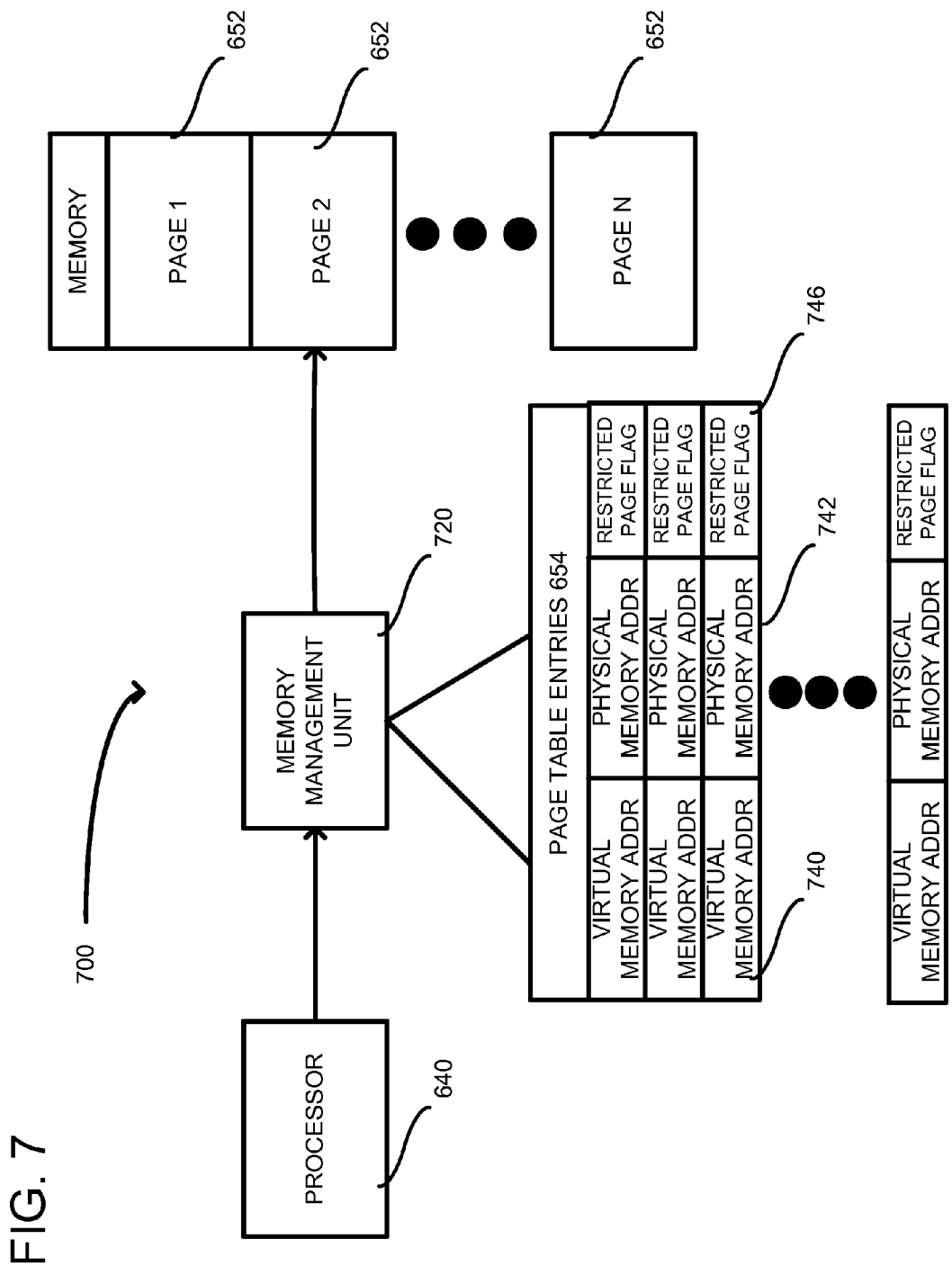
FIG. 7 shows a system diagram according to one embodiment wherein page table entries have a flag indicating that a memory page has a restricted area.

FIG. 7 shows a system diagram 700 showing further details of the hardware layer 650 of FIG. 6, wherein a processor 640 can access memory pages 652 using page table entries 654. In this embodiment, a memory management unit 720 is positioned between the processor 640 and the memory 652. The memory management unit 720 is a computer hardware component responsible for handling accesses to memory requested by the processor 640. The functions of the memory management unit 720 include transforming virtual memory addresses 740 to physical memory addresses 742. An additional field, shown at 746, is a restricted page flag, which indicates that the memory page associated with the physical memory address 742 is restricted or not. The processor 640 can detect this flag, and in response, and if the flag 746 is active, store the current state of the virtual machine and pass control of the current instruction to the emulator.

Figure 8:
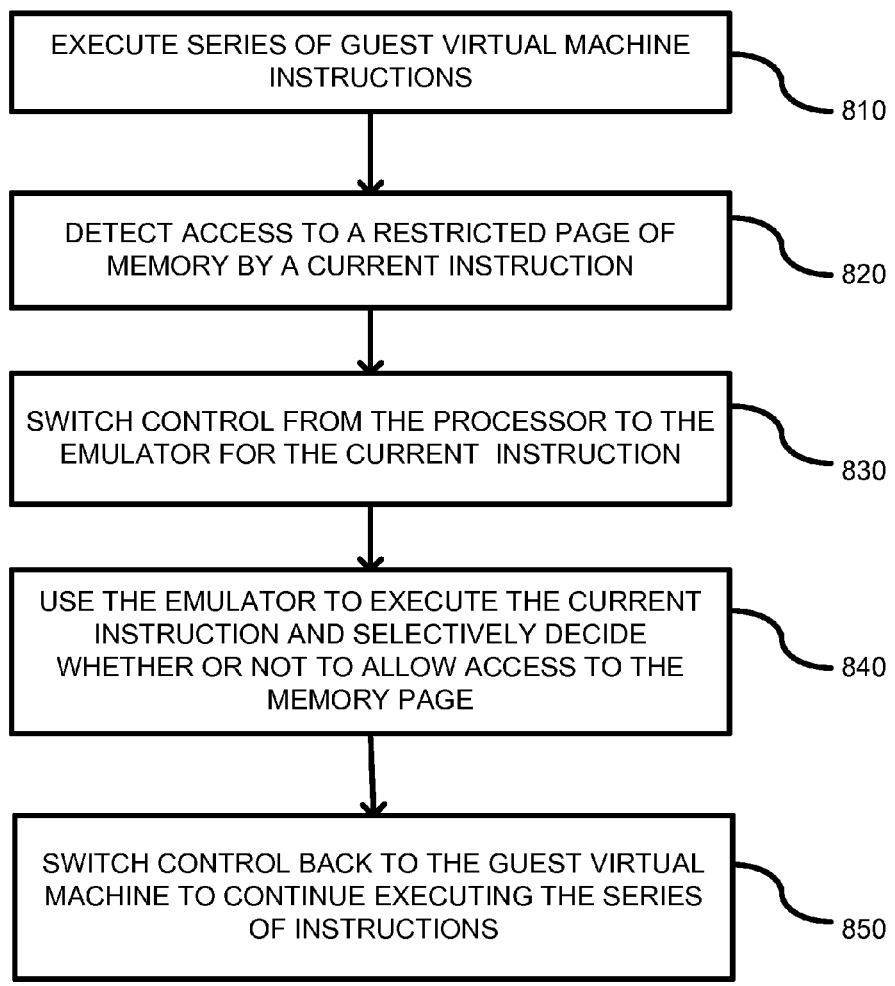
FIG. 8 is a flowchart of a method, according to one embodiment, for selectively deciding whether or not to allow access to a page of memory.

FIG. 8 is a flowchart according to one embodiment for restricting access to memory mapped registers. In process block 810, a series of virtual machine instructions are executed, such as by a processor. The instructions can be any software program that executes in order to cause the computer to perform useful tasks. The virtual machine typically has a virtual memory map and communicates through an operating system in order to access physical memory. In process block 820, access to a restricted memory page by a current instruction is detected. As described above, such detection can be made by accessing a page table and detecting a flag associated with the address that is being accessed. In process block 830, the processor can switch control from the guest virtual machine to an emulator under control of the compute service provider for executing the current instruction. Switching control can include terminating the execution of the current instruction, storing information related to the current instruction, such as state information, and calling the emulator so that it can reconstruct the current instruction using the stored information. In process block 840, using the emulator, the current instruction can be executed. Moreover, the emulator can selectively decide whether or not to allow access to the memory page being accessed. Selectively deciding can include using the emulator to re-detect access to the memory page for the current instruction. By re-detecting it is meant that the processor first detected access to the memory page on the same current instruction as the emulator. The emulator can then determine a particular memory address on the memory page to which the current instruction is attempting to access. Finally, the emulator can compare the memory address to a stored list of memory addressees or a range of memory addresses. In case of a match, the emulator can deny access, whereas in case there is no match the emulator can allow access. In process block 850, once the emulator completes the current instruction, it can switch control back to the guest virtual machine to continue executing the series of instructions. Thus, at least two seamless transitions occur by switching control from the processor to the emulator under control of the service provider and then back to the guest virtual machine, all of which is transparent to the virtual machine.

Figure 9:
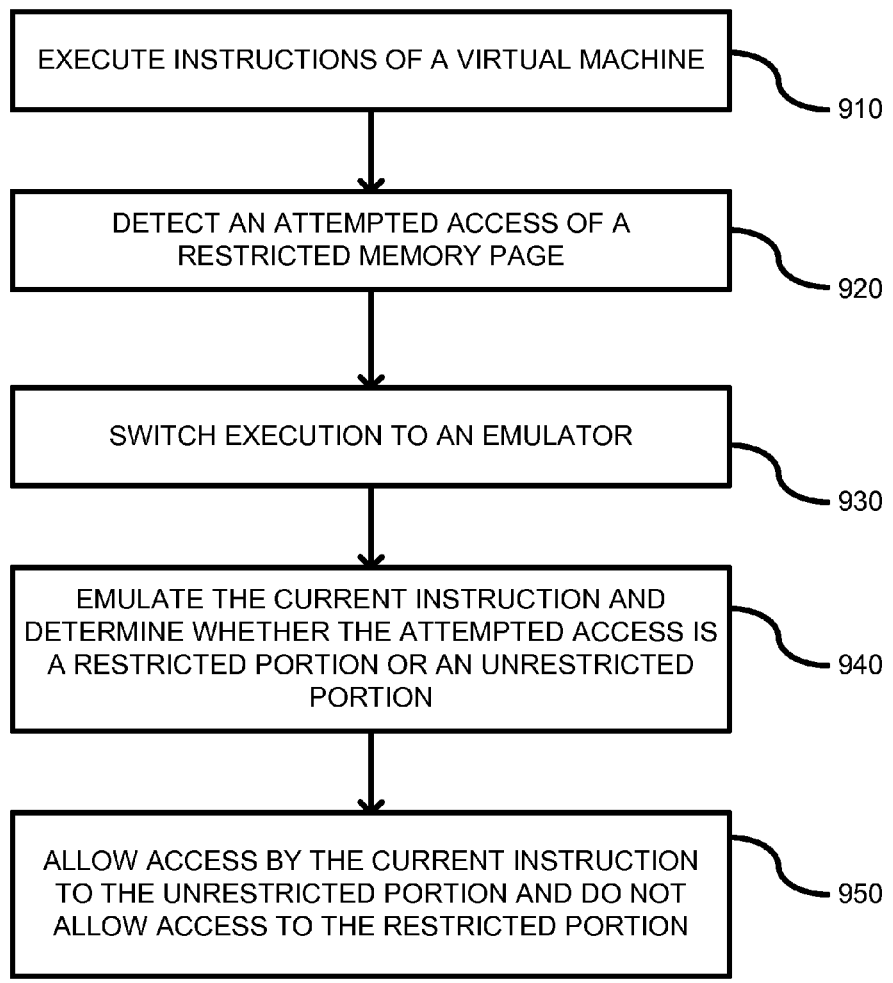
FIG. 9 is a flowchart of a method, according to another embodiment, for allowing or not allowing access to portions of a memory page.

FIG. 9 is a flowchart according to another embodiment for restricting access to memory mapped registers. In process block 910, instructions are executed so as to run the program. In process block 920, an attempted access of a restricted memory page is detected, such as through detection of the restricted page flag 746 in the page table 654. Such a detection is made by the processor or the memory management unit as the processor attempts to determine the physical memory address to be accessed. Once the detection is made, the processor can construct a trap frame that contains enough information that the emulator can reconstruct the state prior to emulating the current instruction. In process block 930, execution is switched to the emulator. Typically, the processor calls the emulator and the emulator uses the trap frame to reconstruct the state. In process block 940, the emulator emulates the current instruction and determines whether the attempted access is a restricted portion of a memory page or an unrestricted portion. Such a determination can be made by comparing the memory address being accessed to a stored list of memory addresses or a range of memory addresses. If the memory address matches one of those addresses on the stored list or if the memory address is within the range of addresses, then the emulator can choose to not allow access to the restricted memory portion (process block 950). Alternatively, if the memory address does not match one of those addresses or is not within the range of addresses, then the emulator can choose to allow access to the memory register by the current instruction (process block 950).

Figure 10:
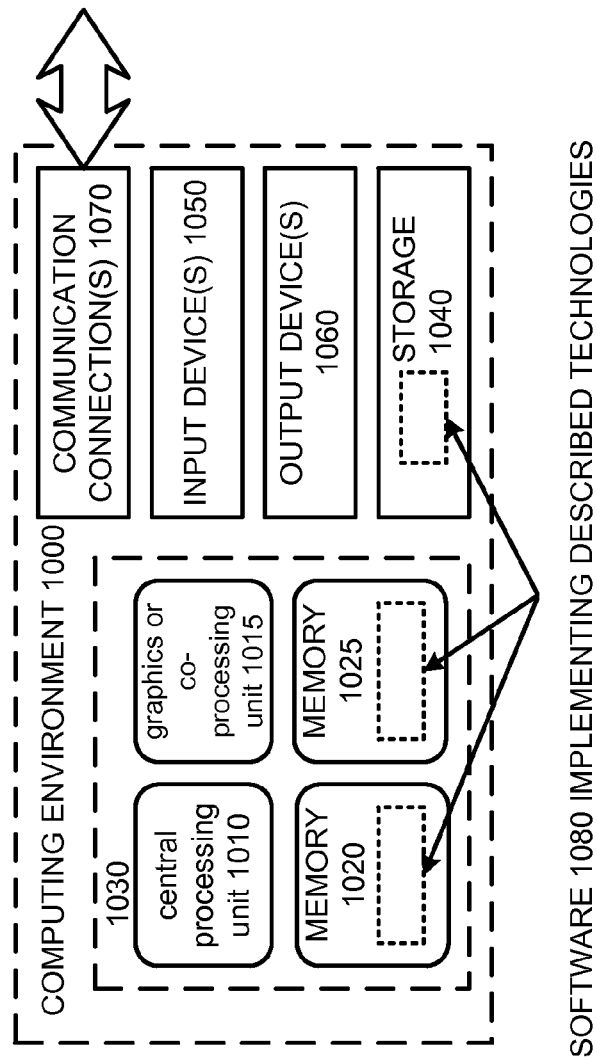
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.).

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of restricting access to memory mapped registers, comprising:
    executing a series of instructions in a virtual machine using a processor;
    while executing the series of instructions, detecting an access to a restricted memory page by a current instruction;
    in response to the detection, switching control from the processor to an emulator for the current instruction, the emulator duplicating functions of the virtual machine in a host computer system different than the virtual machine;
    using the emulator, executing the current instruction and selectively deciding whether or not to allow the current instruction access to the memory page based on whether the access is to a restricted memory area or an unrestricted memory area on the memory page; and
    after the current instruction is executed by the emulator, switching control back to the virtual machine to continue executing the series of instructions.

2. The method of claim 1, further including sending an alarm that the current instruction requested access to the restricted memory area.

3. The method of claim 1, further including detecting whether the selectively deciding is turned ON or OFF.

4. The method of claim 1, wherein the memory area is associated with a memory address or a range of memory addresses.

5. The method of claim 1, wherein the selectively deciding includes not allowing access to the restricted memory area and proceeding with the execution of the series of instructions without a fault notification.

6. The method of claim 1, wherein selectively deciding includes comparing an address within the memory page that the current instruction is accessing and a predetermined memory address or a predetermined range of memory addresses that are a subset of the memory page.

7. The method of claim 1, wherein selectively deciding includes allowing the current instruction access to some memory registers on the memory page and not allowing the current instruction access to other memory registers on the memory page.

8. The method of claim 1, further including selecting a policy document based on a privilege level of the virtual machine and wherein selectively deciding whether or not to allow the current instruction access to the memory page is controlled by the policy document.

9. A computer-readable storage having instructions thereon for executing a method of restricting access to memory mapped registers, the method comprising:
    executing instructions in a virtual machine;
    for a current instruction being executed, detecting an attempted access of a restricted memory page;
    in response to the detection, switching execution of the current instruction to an emulator that substantially functions like the virtual machine, but is not under control by the virtual machine;
    using the emulator, determining whether the attempted access to the memory page is to a restricted portion of the memory page or an unrestricted portion of the memory page; and
    allowing access by the current instruction to the unrestricted portion and not allowing access to the restricted portion.

10. The computer-readable storage of claim 9, wherein a processor detects the attempted access to the memory page and switches execution to the emulator.

11. The computer-readable storage of claim 9, wherein when the emulator does not allow access to the restricted portion, the instructions continue to be executed as if the access was allowed.

12. The computer-readable storage of claim 9, further including reading a policy document that turns ON or OFF the switching of the execution to the emulator.

13. The computer-readable storage of claim 9, further including generating an alarm that the restricted portion of the memory page was accessed.

14. The computer-readable storage of claim 9, further including switching execution of the instructions to a processor executing the instructions under guest control and continuing to execute instructions without a fault even when memory access is not allowed to the restricted portion.

15. The computer-readable storage of claim 9, further including disregarding any portion of the current instruction that has been executed prior to the detection.

16. The computer-readable storage of claim 9, wherein selectively deciding further includes:
    using the emulator, re-detecting access to the memory page for the current instruction;
    determining a memory address on the memory page to which the current instruction is attempting to access;
    comparing the memory address to a stored list of memory addresses or a range of memory addresses;
    detecting that the memory address matches one of the memory addresses in the stored list or is within the range of memory addresses; and
    in response to the detection, not allowing the access to the memory address.

17. The computer-readable storage of claim 9, wherein detecting the attempted access of the restricted memory page further includes:

accessing a page table that maps virtual addresses to physical addresses;

detecting a flag indicating that the memory page is restricted; and storing a current state of the virtual machine; and passing control to the emulator.

18. The computer-readable storage of claim 9, wherein the virtual machine is executing in a multi-tenant environment, and wherein the emulator is run within a hypervisor executing on a same server computer as the virtual machine.

19. The computer-readable storage of claim 9, wherein switching execution of the current instruction to an emulator further includes:

terminating execution of the current instruction;

storing information related to the current instruction; and calling the emulator so that it can reconstruct the current instruction using the stored information.

20. A system for restricting access to memory mapped registers, comprising:

a guest virtual machine executing on a partition in a multi-tenant environment of a service provider;

a memory having at least one restricted area in which the guest virtual machine cannot access and unrestricted areas in which the guest virtual machine can access;

a processor coupled to the memory and executing instructions of the guest virtual machine; and an emulator coupled to the processor for running at least one instruction of the guest virtual machine when the guest virtual machine attempts access to a restricted area of the memory, the emulator under the control of the service provider rather than the guest virtual machine, the emulator for selectively deciding whether or not to allow the virtual machine to access the restricted area of the memory.

21. The system of claim 20, wherein the processor switches control of executing the at least one instruction when the processor detects access to a memory page including the restricted area.

22. The system of claim 20, wherein the emulator reads a policy document to decide how to respond to the virtual machine after the emulator selectively decides whether or not to allow the virtual machine to access the restricted area of the memory.

* * * * *